Figure 4A:
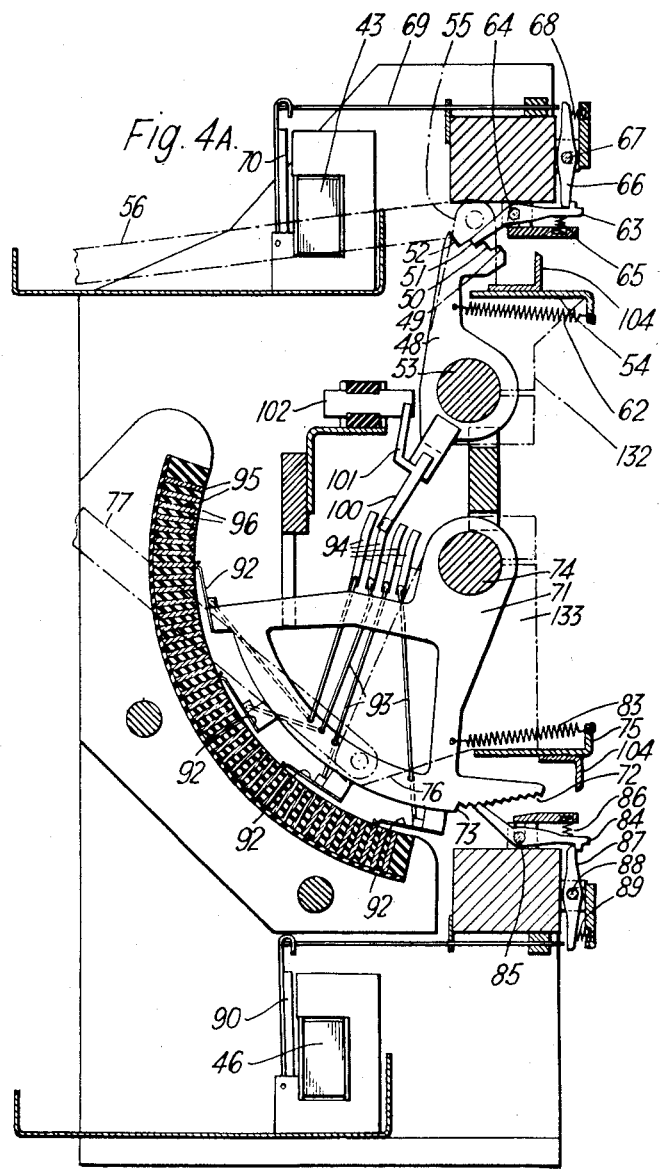

Nov. 27, 1956  R. E. BALDWIN  2,772,051
RECORD CARD CONTROLLED STATISTICAL MACHINES
Filed Oct. 14, 1955  10 Sheets-Sheet 1
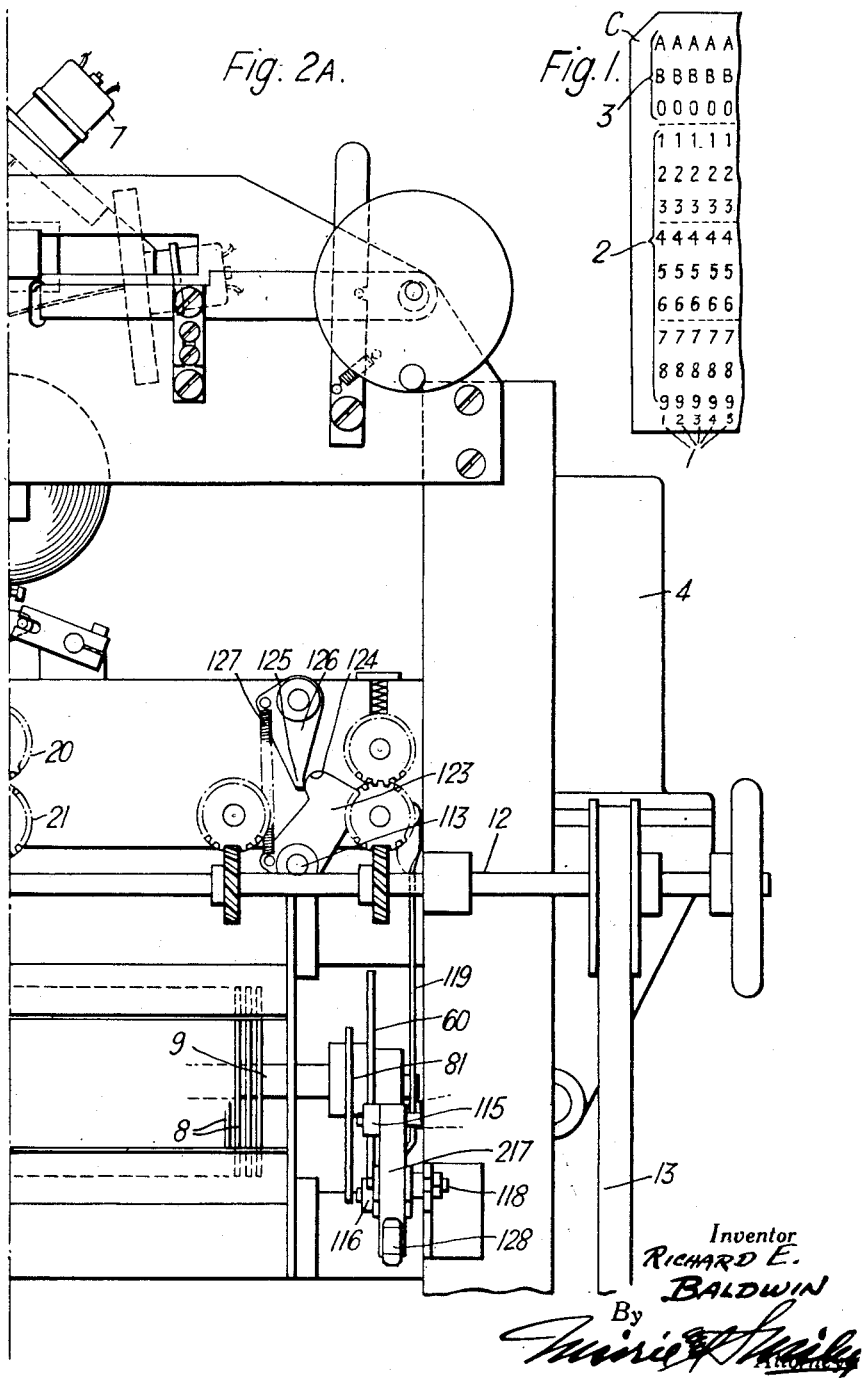

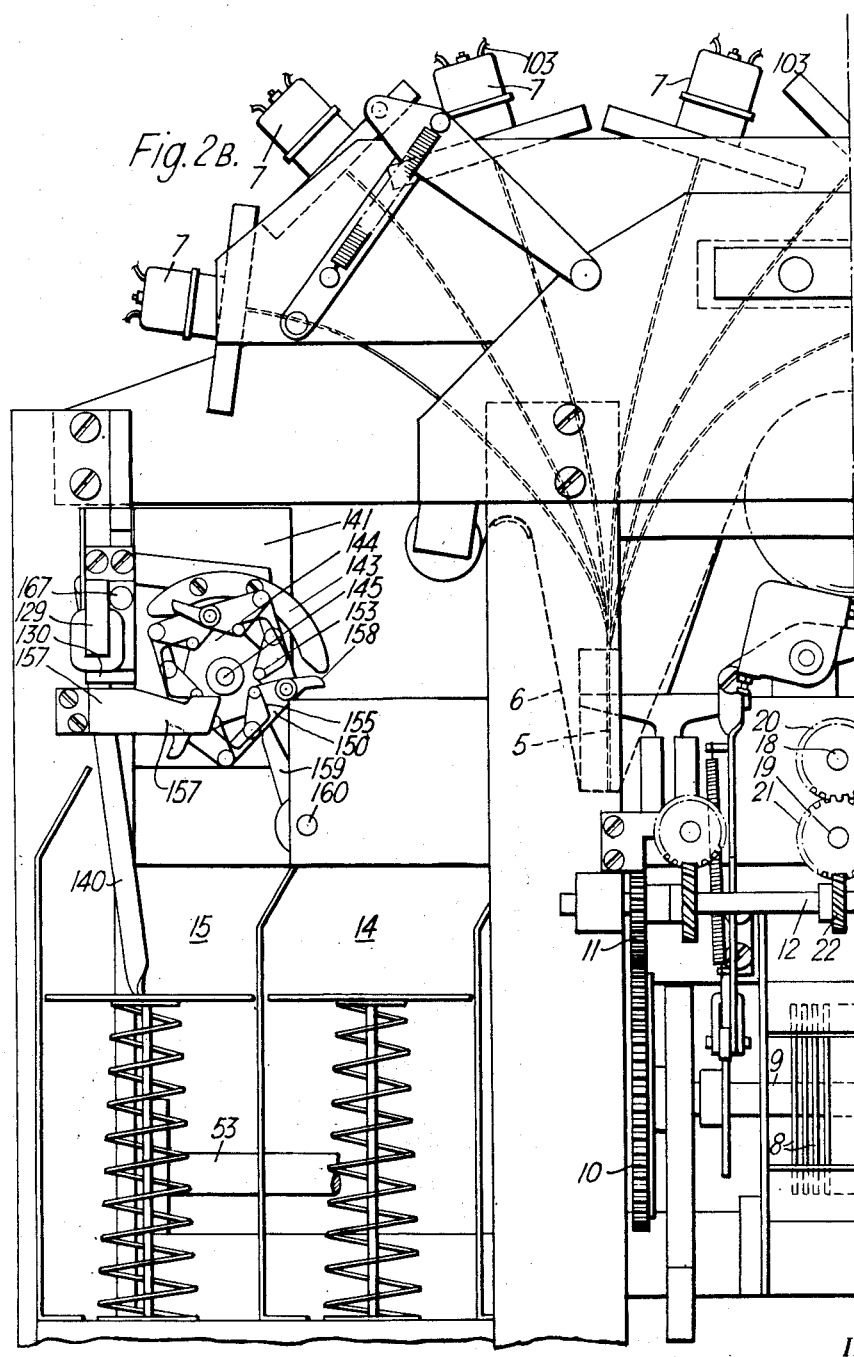

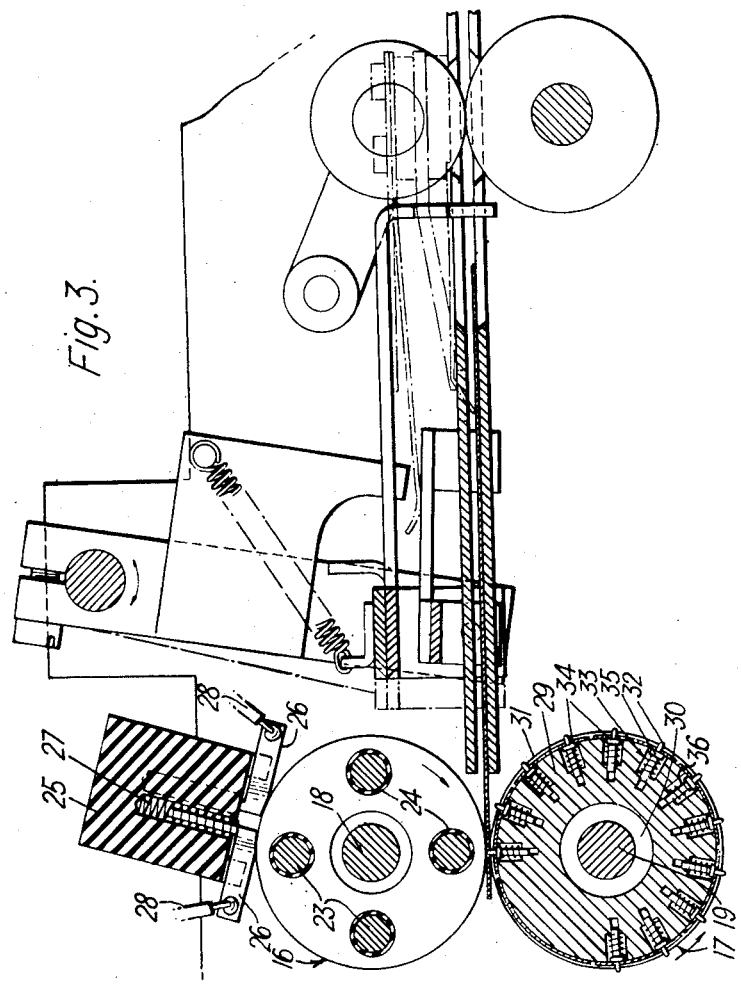

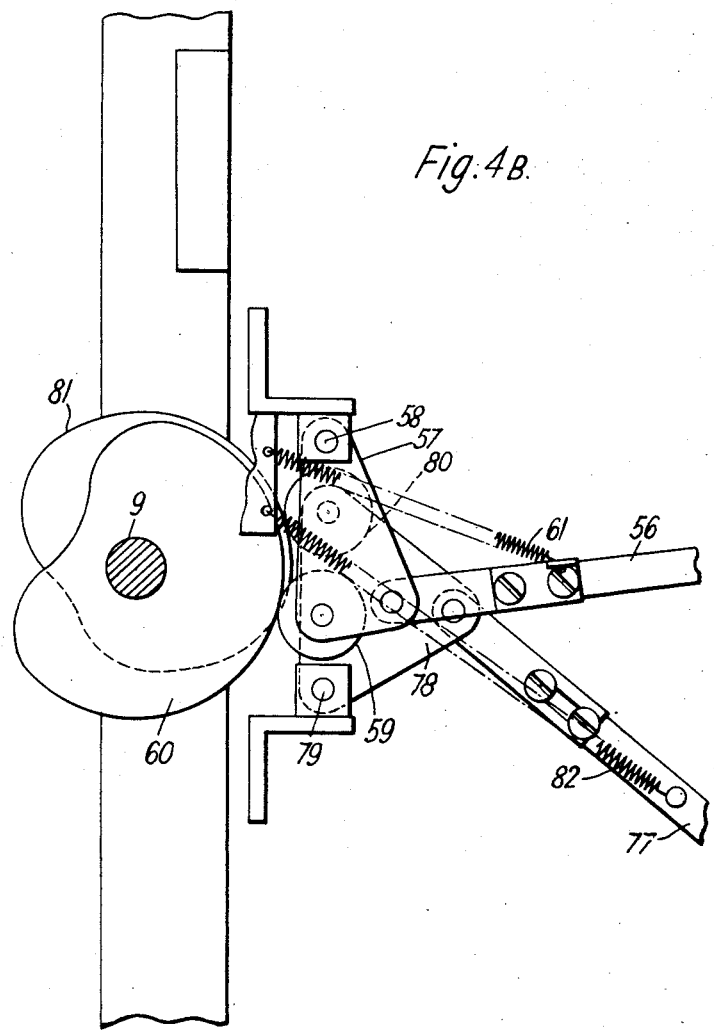

Nov. 27, 1956          R. E. BALDWIN          2,772,051
RECORD CARD CONTROLLED STATISTICAL MACHINES
Filed Oct. 14, 1955                    10 Sheets-Sheet 6

Inventor
RICHARD E. BALDWIN
By

Inventor
RICHARD E. BALDWIN
By

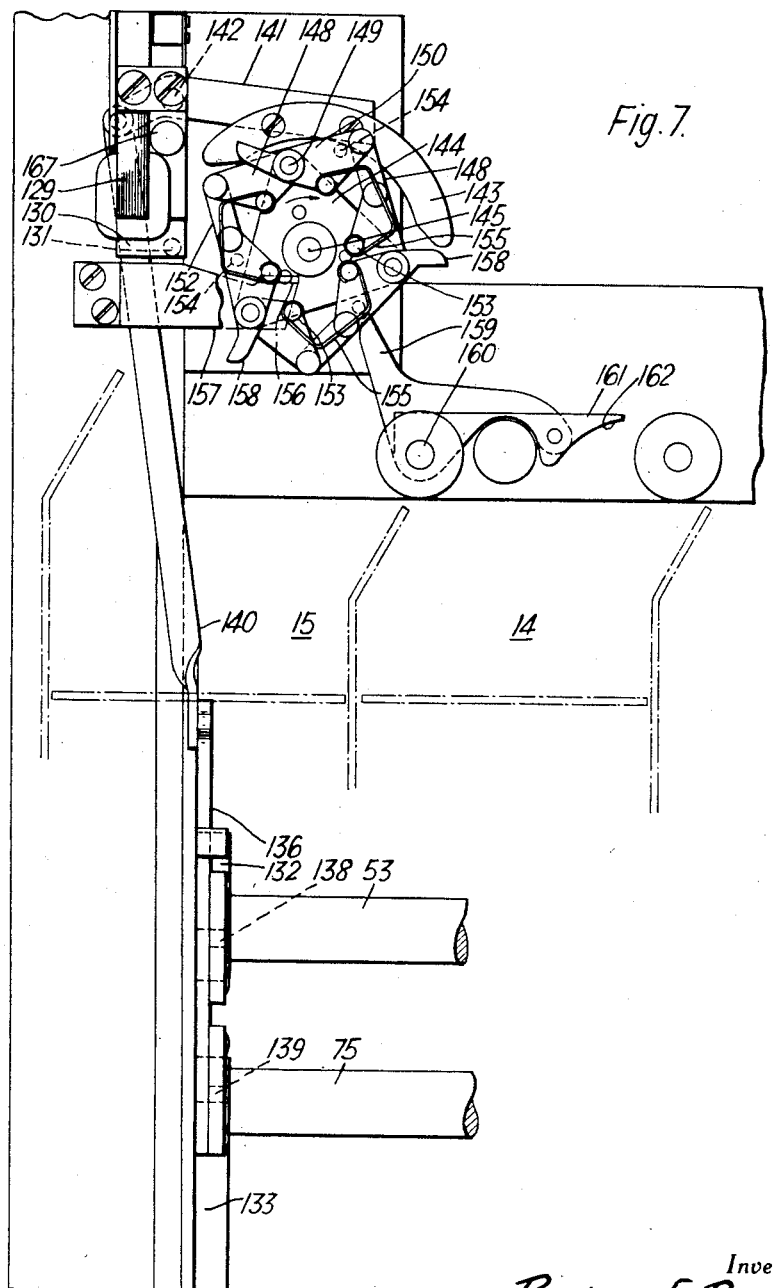

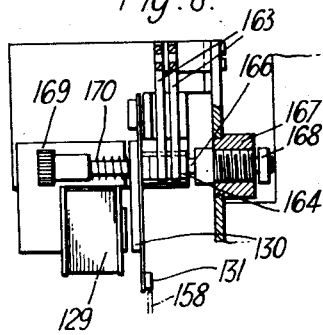
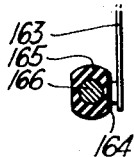
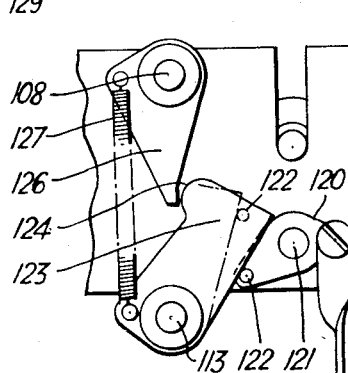
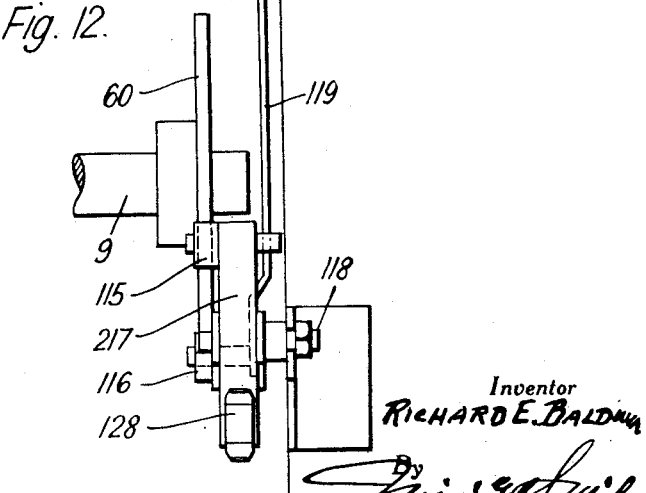

Nov. 27, 1956   R. E. BALDWIN   2,772,051
RECORD CARD CONTROLLED STATISTICAL MACHINES
Filed Oct. 14, 1955   10 Sheets—Sheet 10
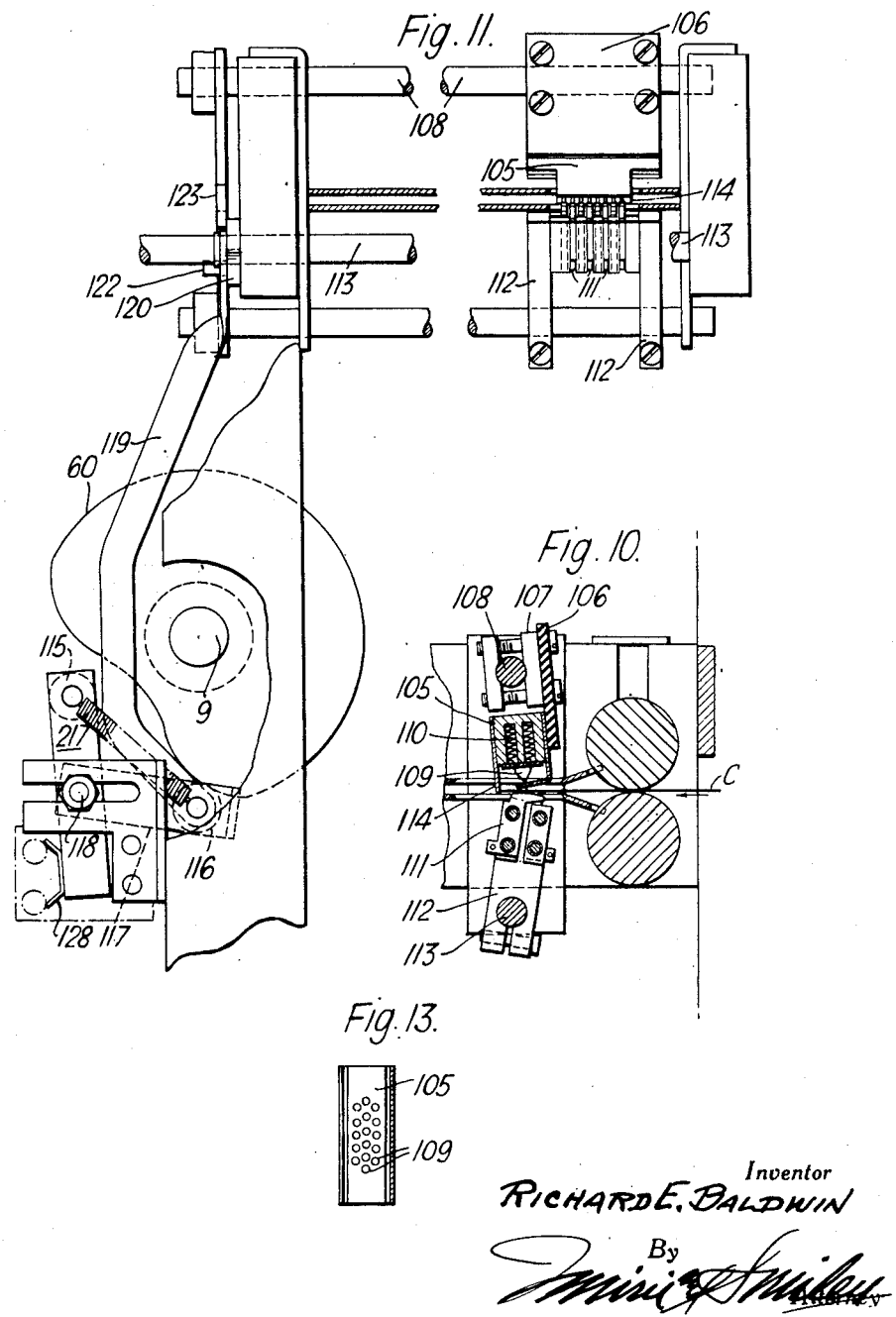
Inventor
RICHARD E. BALDWIN

United States Patent Office 2,772,051
Patented Nov. 27, 1956

2,772,051

RECORD CARD CONTROLLED STATISTICAL MACHINES

Richard Everest Baldwin, Coulsdon, England, assignor to Powers-Samas Accounting Machines Limited, London, England, a British company Application October 14, 1955, Serial No. 540,593

Claims priority, application Great Britain December 24, 1954

18 Claims. (Cl. 235—61.6)

This invention relates to record card controlled statistical machines and in particular to apparatus for decoding data recorded in code by data-indicating indicia in zonal areas of vertical columns of statistical record cards.

As is well understood in the art a record card is provided with a plurality of vertical columns in which data is recorded, for example by indicia such as perforations or marks. Each vertical column of a card usually consists of twelve data-indicating positions of which the last or lower nine positions are employed to record the digits 1 to 9. When a character of the alphabet or a character other than one of the digits 1 to 9 is to be recorded in the card column such other character is recorded by indicia in one of the upper three positions of the column either alone or in combination with one of the lower nine positions thereof. When a printed record is to be made of the data recorded on a card it is necessary before printing can be effected to decode the data recorded on the card and a number of decoding devices for this purpose are well known in the art. It is also known in the art to sense data recorded in a card while the card is in a stationary position or while the card is being moved past the sensing position, and decoding devices are well known for use with both such forms of sensing.

It is an object of the present invention to provide a new and advantageous form of decoding device primarily for use with a sensing device which co-operates with a card being moved past the device during the sensing thereof and, in particular, to provide a decoding device capable of operation at high speeds to permit its use with a high speed character-defining device which does not use a set of type for each card column sensed. A character-defining device of the kind just mentioned is described in United States Patent specification No. 2,674,652.

It is a further object of the present invention to provide means whereby, under control of record cards, the decoding device can be retained in a condition thereof to which it is set by the sensing of one card thereby to permit the same data to be printed on a plurality of cards fed in succession to said one card.

According to the present invention there is provided apparatus for decoding data recorded in code by data-indicating indicia in zonal areas of vertical columns of statistical record cards, comprising a sensing device operable to sense a moving card and to transmit electric signals representative of coded data sensed from a card, an electric signal transmitter for each of a predetermined number of characters any one of which may be recorded in code in a card column, a selector member for each zonal area of each card column sensed, said selector members being movable in predetermined paths in timed relation with movement of a card during sensing thereof, an arrester element co-operating with each selector member and operable to arrest movement thereof in accordance with a signal received thereby from the sensing device, a plurality of electric conductor bars disposed to be parallel with the path in which a predetermined one of the selector members for each card column is movable, said bars being connected electrically each to a predetermined one of the signal transmitters, a plurality of electric brushes movable with each said predetermined one selector member, each said brush being supported by its selector member to cooperate with a group of adjoining conductor bars different from groups of bars with which the other brushes respectively co-operate, and electric connecting elements connecting the selector members to determine which said brush and conductor bar is rendered active to condition the signal transmitter controlled thereby.

The apparatus may include for each card column sensed a first selector member arrestable by its arresting element in any one of a predetermined number of positions thereof, a second selector member which is said predetermined one selector member and is arrestable by its arresting element in any one of a predetermined number of positions thereof, a number, equal to the number of predetermined positions for the first selector member, of equi-spaced electrical brushes carried by the second selector member each for co-operation with a group of conductor bars of which each group consists of a number of bars corresponding to the number of predetermined positions for the second selector member, electric connecting elements carried by the second selector member and connected one to each said brush, a movable electric connecting element movable with said first selector member for co-operation with one or other of said connecting elements, a first restoring member common to all first selector members to control movement thereof, a second restoring member common to all second selector members to control movement thereof, and cam-controlled elements to effect operation of the first and second restoring members in timed relation with each other and with movement of a card during sensing thereof. The first and second selector members may each comprise a toothed sector movable angularly about a fixed axis, the axis for the first sector being located above that for the second sector and in the same plane.

Each sector-arresting element may comprise a pawl pivoted for angular movement about a fixed axis to co-operate with the teeth on its sector, and for each pawl there may be provided a pivoted latch, a latch-operating member co-operating with each latch to render the latch inactive in relation to its pawl, and an electro-magnet connected to the latch-operating member and operable under control of an electric signal from the sensing device to effect operation of the latch-operating member.

The restoring members may be movable angularly about the respective axes of the sectors and include co-operating latch elements operable to latch the restoring members against restoring the sectors to the starting positions thereof, and a preliminary sensing device operable in advance of each first mentioned sensing device to sense a predetermined control-indicating position on a card and co-operating with the latch elements to effect latching of the restoring members when a control-indicating hole in a card is sensed by the preliminary sensing device.

The preliminary sensing device may include mutually rockable upper and lower sensing members between which a card is moved, rocking elements operable in timed relation with the movement of a card and connected with the sensing members to effect mutual rocking thereof, an electro-magnet electrically connected with the sensing members for control thereby and having an armature to control operation of said latch elements, and a switch operable in timed relation with the movement of the cards to control the application of electric energy to the magnet circuit when a card is in the desired sensing relation with said sensing members.

The latch elements may comprise a toothed latching plate movable angularly with each restoring member, and a rockable toothed bell-crank carrying thereon two teeth one for co-operation with each said latching plate whereby the teeth on the bell-crank are simultaneously engaged with or disengaged from the toothed latching plates. The apparatus may also include a link connected to the bell-crank to effect rocking thereof, and a time-lag device controlled by the armature of said electro-magnet and co-operating with said link to effect actuation thereof.

The time-lag device may include a toggle-carrying plate rotatable in timed relation with the rocking of said sensing members, a plurality of equi-spaced toggles carried by the toggle-carrying plate, a fixed trip member mounted in the path of said toggles to move active ones thereof to an inactive position thereof, a toggle-setting member movable with said armature to move the toggles to active conditions thereof, and a link-operating arm connected with said link and movable by a toggle in the active condition thereof thereby to effect operation of the link to cause cooperation of the toothed bell-crank with the toothed latching plates.

Figure 5:
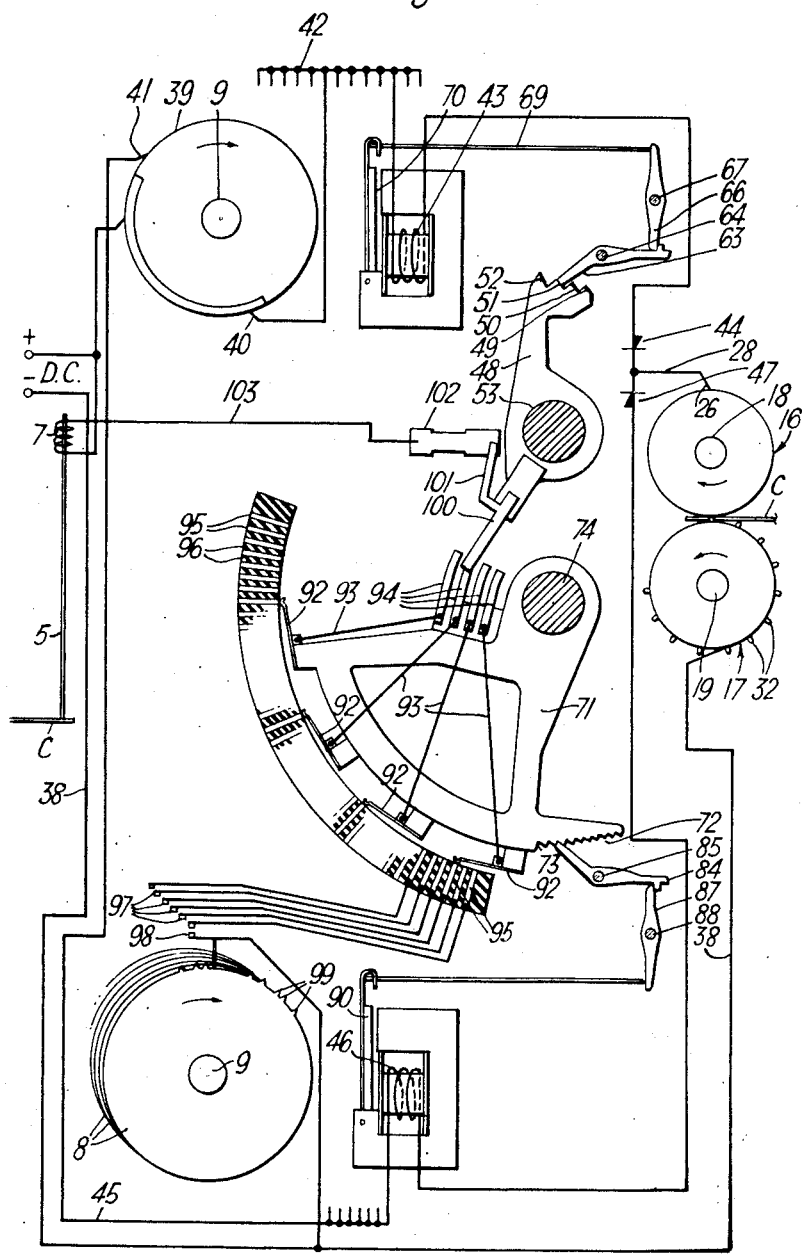
Figure 6:
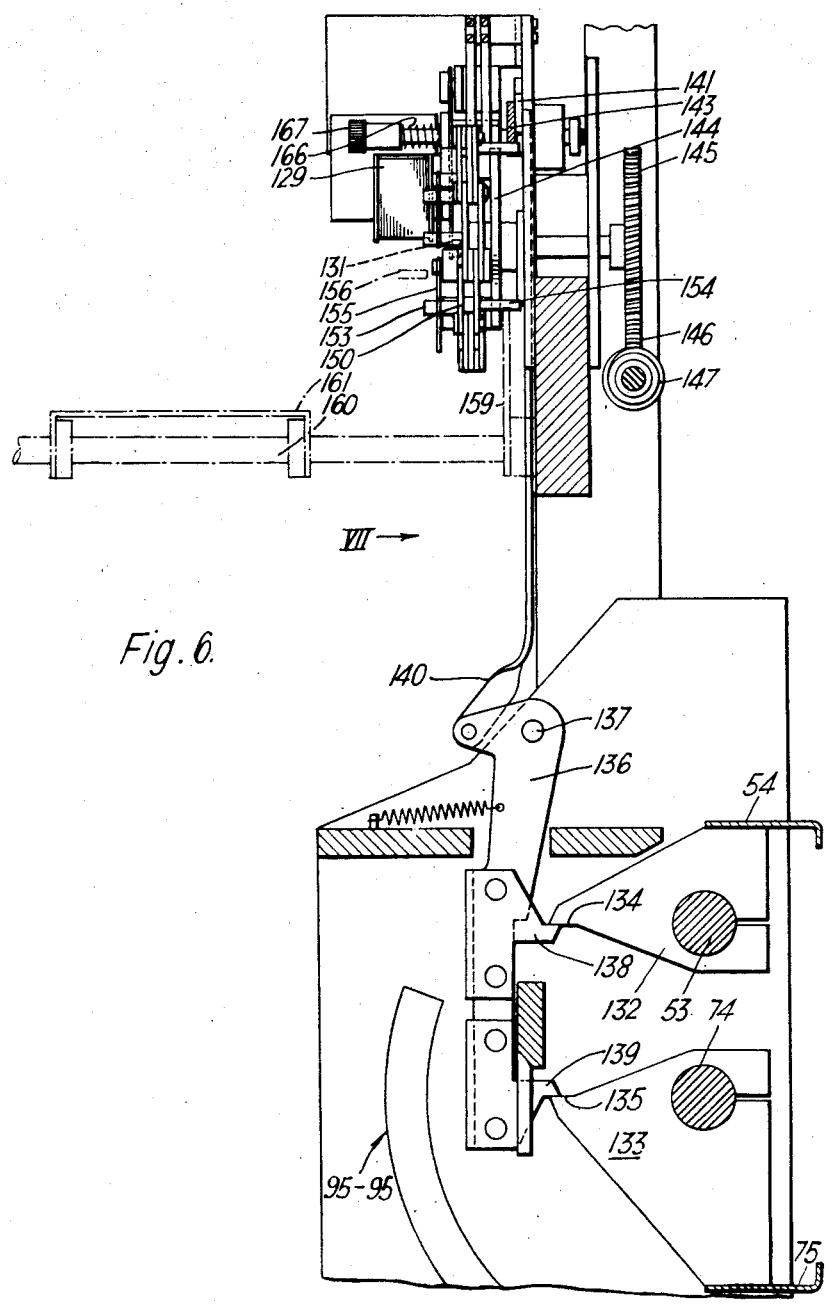

In order that the invention may be clearly understood, one embodiment thereof will now be described, by way of example, with reference to the accompanying diagrammatic drawings, in which:

Fig. 1 illustrates a part of a statistical record card,

Figs. 2A and 2B together are a diagrammatic side elevation of a machine to which apparatus according to the invention is to be fitted, Fig. 3 is a sectional elevation of a sensing device for sensing a moving card and of part of the mechanism for feeding the card to the sensing device, Figs. 4A and 4B together are an elevation, partly in section, of decoding apparatus according to the invention, Fig. 5 is an electric circuit diagram, Fig. 6 is an end view, partly in section, of mechanism for retaining the decoding apparatus in a set position thereof, Fig. 7 is a side view of Fig. 6, looking in the direction of arrow VII, Fig. 8 shows a detail of the mechanism illustrated in Fig. 6, Fig. 9 is an elevation of a part of the apparatus shown in Fig. 8, Fig. 10 is a sectional elevation through a preliminary sensing device to control the operation of the apparatus shown in Figs. 6 and 7, Fig. 11 is a broken side elevation of some of the apparatus shown in Fig. 10, Fig. 12 is a view of Fig. 11 looking in the direction of arrow XII, and Fig. 13 is a plan of a part of the mechanism shown in Fig. 10.

Referring to the drawings, Fig. 1 illustrates a record card C in which data can be recorded by data-indicating indicia provided in zonal areas of vertical columns of the card. As can be seen from Fig. 1, the record card comprises a plurality of vertical columns 1, each of which columns is provided with a zonal area 2 in which can be recorded the digits 1 to 9 and a zonal area 3 consisting of three data-indicating positions indicated in the drawings respectively as A, B and 0. When recording data other than the digits 1 to 9 such other data is recorded by utilizing one of the positions in zone 3 either alone or in combination with one of the positions in zone 2.

For the purpose of describing the present invention it is assumed that the apparatus according to the invention is to be applied to a printing interpreter, that is a machine which senses data from a record card and prints thereon a record of the data so sensed. Figs. 2A and 2B together show diagrammatically a printing interpreter having a card magazine 4, Fig. 2A, from which, in known manner, cards are fed one at a time to a sensing device, shown in Fig. 3, which is arranged to sense the cards during forward movement thereof, the cards then being moved to and continuously past a character-defining position at which characters decoded by the mechanism to be described below are defined on the card during forward movement thereof by styluses 5, Figs. 2B and 5, one for each card column sensed, the marking ends of the styluses being pointed and reciprocated continuously in a direction normal to the direction of movement of the card and in a plane parallel with that of the card. To effect definition of characters, the styluses receive lengthwise impulses which cause them to impinge against a carbon ribbon 6, Fig. 2B, or the like thereby to effect character-defining marks on the card. The lengthwise movements of the styluses are controlled by moving coil magnets 7 appropriate thereto and energized under control of an electric signal transmitter in the form of character-determining discs 8, Figs. 2A, 2B and 5, rotatable with a main shaft 9 which is rotated by a gear 10, Fig. 2B, driven, through an idler, by a gear 11 rotatable with a drive shaft 12, the drive shaft being rotated in any suitable manner, as for example by a belt 13, Fig. 2A, driven by a motor not shown. The mode of effecting character definition by means of the styluses 5 forms no part of the present invention, the apparatus for effecting operation of the styluses being similar to that shown in, and operating in the manner described in United States Patent specification No. 2,674,652. After passing the impression-receiving position, the cards are delivered into one or other of two card receivers 14, 15, Fig. 2B.

The cards fed from the magazine 4 are fed through the machine by feed rollers driven from the drive shaft 12 and these, together with the card sensing device shown in Fig. 3, form no part of the present invention. The sensing device will, however, be briefly described insofar as it is desirable to facilitate the understanding of the mode of operation of the decoding device to be described below.

The sensing device shown in Fig. 3 consists of an upper composite roller 16 and a lower roller 17, the rollers being mounted respectively on rotatable shafts 18, 19 driven in 1:1 ratio by gear wheels 20, 21, Figs. 2A and 2B, from a gear wheel 22 on drive shaft 12. From Fig. 3 it will be seen that the axes of rotation of the rollers 16, 17 are disposed to be vertically one above the other, the upper roller 16 consisting of alternate electrically conductive discs and insulating discs. The electrically conductive and insulating discs are clamped together along the axis of shaft 18 by rods 23 and plates made of insulating material and nuts, not shown, the rods 23 being insulated from the conductive discs by insulating sleeves 24. Mounted above the composite rollers 16 is a contact-carrying block 25 made of insulating material and supporting a plurality of L-shaped contacts 26, one for each conductive disc. The axial spacing of the conductive discs is such that one disc is aligned with each vertical card column 1 to be sensed and the contacts 26 are urged into engagement with the peripheries of the conductive discs by springs 27 housed in the block 25. The limbs of the contacts 26 which engage the conductive discs are arranged to extend in opposite directions to provide sufficient space for the connection thereto of electrical leads 28 along which electric signals are transmitted when perforations are sensed in a card.

The lower roller 17 is also a composite roller consisting of a portion 29 made from electrically conductive material, such portion being supported at its opposite ends by sleeves 30 formed from insulating material, the sleeves serving to insulate the roller from the shaft 19. The sleeves 30 are bounded by rings 31 made of electrically conductive material secured to the roller portion 29, the sleeves being of slightly less diameter than that of the end plates provided on the composite roller 16 and disposed beneath said end plates so that a card can be nipped between the end plates and the ring 31 to be fed continuously forward thereby during the sensing of a card. The portion 29 of the roller 17 is of slightly less diameter than that of the conductive disc forming part of the roller 16 so that the portion 29 does not make contact with the conductive discs.

Around the periphery of the roller 17 are arranged a plurality of columns of sensing pins 32 of which one column is shown in Fig. 3, there being in each column a number of pins 32 corresponding to the number of data-indicating positions in both zones 2 and 3 in a vertical column 1 of a card. As can be seen from Fig. 3 each sensing pin is located in a recess 33 formed as a slot extending lengthwise of the roller portion 29, the recess being covered by strips 34 against which shoulders 35 formed on the pins 32 are urged by springs 36 housed in the recesses 33. The tail or inner ends of the pins extend into drilled holes 39 communicating with the recesses 33 so that when a pin is depressed axially it will be depressed against the action of its spring 36. The dimensions of the pins 32 are such that they pass freely into a card perforation without touching the sides of the perforation so that card feeding past a sensing position is effected solely by co-operation between the peripheral portions of the end plates of roller 16 and the rings 31 of roller 17.

It will be understood that the radial sensing pins 32 engage their appropriate card data-indicating positions at a position in advance of the line of contact between the rollers 16 and 17 and the angular velocity of the rollers 16 and 17 is such that the pins 32 are moved with a linear speed equal to the linear speed of the card. Pins 32 which co-operate with card perforations enter the perforations prior to the perforations being passed between the rollers 16, 17 and are withdrawn from the perforations after they have passed between the co-operating portions of the rollers. Those pins 32 which pass through data-indicating perforations co-operate with the conductive discs appropriate thereon on roller 16 and during the interval of engagement, or possible engagement, of the pin with its conductive disc an electrical signal is applied to the conductive portion 29 of roller 17 so that output signals as appropriate pass along the leads 28.

The application of electrical potential to the conductive rings 31 is by way of a lead 38, Fig. 5, and is controlled by a rotary switch 39 rotatable with the main shaft 9. The rotary switch 39 co-operates in turn with a first contact 40 and a second contact 41, being engaged with the contact 40 while the data-indicating positions of zone 3 of a card are being sensed and engaged with the contact 41 while the data-indicating positions of zone 2 of a card are being sensed. When a data-indicating perforation is sensed in zone 3 of the card a circuit is established from the supply terminal through the switch 39 and contact 40, a first lead 42 common to zone 3 of all card columns to be sensed, the coil of an electro-magnet 43, to be referred to below, a rectifier 44, the appropriate conductive ring of roller 16, a pin 32 of roller 17 which has passed through the data-indicating perforation and lead 38.

Similarly, when a data-indicating perforation is sensed in zone 2 of a card column, a circuit is established from the supply terminal through the rotary switch 39 and contact 41, a lead 45 common to zone 2 of all card columns to be sensed, the coil of an electro-magnet 46, to be referred to below, a rectifier 47, an appropriate conductive ring of roller 16, a pin 32 of roller 17 which has passed through the data-indicating perforation, and lead 38.

The energization of the electro-magnets 43, 46 determines the extent of movement of a selector member appropriated thereto, one such member being provided for each zonal area of each card column sensed. In the embodiment of the invention shown in the drawings, a first selector member for each card column is shown as a first toothed sector 48, Figs. 4A and 5, having four teeth 49, 50, 51, 52 of which the last tooth 52 extends above the other three teeth. The sectors 48 are freely pivoted on a rocking shaft 53 and are retained in the starting or inactive positions thereof by a first restoring member 54, common to all the first sectors 48, and supported at one end by a latch member 132 and at its other end by an arm 55, the member 132 and arm 55 both being secured to shaft 53. Rocking of the shaft and restoring member is effected by a link 56, Fig. 4A, which is connected to arm 55 and to an arm 57 pivoted at 58 and supporting a cam follower 59 co-operating with a cam 60 on the main shaft 9, the roller 59 being urged into engagement with the cam by a spring 61. The arm 57, link 56 and arm 55 accordingly constitute cam-controlled elements which effect operation of the first restoring member 54. From Fig. 4A it will be seen that the sectors 48 are urged towards the restoring member 54 by springs 62.

The cam 60 operates the restoring member 54 in timed relation with the movement of a card past the sensing device 16, 17 and as the restoring bar 54 is moved clockwise, as viewed in Fig. 4A, the sectors 48 follow the restoring member, due to the action of springs 62, until, should a data-indicating perforation be sensed in zone 3 of the card, further movement of the sector 48 is arrested by an arresting element comprising a pawl 63 pivoted at 64 and urged by a spring 65 to the active position thereof. Normally the pawl 63 is retained in the inactive position thereof by a latch 66 pivoted at 67 and urged by a spring 68 to the active position thereof. Co-operating with the latch 66 is a latch-operating member 69 formed as a rod movable with the armature 70 of the electro-magnet 43. Thus on energization of the electro-magnet 43 as the result of the sensing of a data-indicating perforation in zone 3 of a card column the armature 70 is moved clockwise, as viewed in Fig. 4A, thus, through the latch-operating member 69, rocking the latch 66 against the action of spring 68 thereby releasing pawl 63 which, under the influence of its spring 65, is moved into the path of the sector 48 and engages with the appropriate tooth 49, 50, or 51 thereof. In the event that no data-indicating perforation is sensed in zone 3 of a card column, clockwise movement of the sector 48 is continued until the longer tooth 52 abuts against the pawl 63, in the inactive position thereof, so that movement of the sector is arrested thereby.

The electro-magnet 46 controls the movement of a second selector member, shown in the drawings as a sector 71 provided with nine teeth 72, one for each data-indicating position of zone 2 of a column of a card and a tenth tooth 73 which extends beyond the teeth 72. The sectors 71 are freely pivoted about a rocking shaft 74 and in the starting or inactive positions the sectors are retained in such position by a second restoring member 75 which is common to all the sectors 71 and is carried at one end by a latch member 133 and at its other end by an arm 76 both being secured to the shaft 74. Rocking of the shaft and second restoring member is effected by a link 77 which is connected to arm 76 and to plates or arms 78, Fig. 4B, pivoted at 79 and carrying a roller 80 which co-operates with a cam 81 on shaft 9. The roller 80 is urged into engagement with cam 81 by a spring 82.

As cam 81 is mounted on shaft 9 for movement therewith, it will be understood that it is operable in timed relation with cam 60 and, through the elements 78, 77, 76 controlled thereby, effects operation of the second restoring member 75 in timed relation with the sensing of a card by the sensing device 16, 17.

It will be understood that the number of teeth on the first and second selector members will be determined by the code which is employed to record data on the cards to be sensed and may, therefore, be either more or less than the four and ten teeth described above.

The sectors 71 are pulled towards the restoring member 75 by springs 83. On movement of the second restoring member 75 in a counterclockwise direction, as viewed in Fig. 4A, the sectors 71, due to the action of springs 83, follow the restoring member 75 until, should a data-indicating perforation be sensed in zone 2 of a card column, further movement of the sector is arrested by a second arresting element in the form of a pawl 84, pivoted at 85, and urged by a spring 86 towards the active position thereof. Normally the pawls 84 are retained in the inactive positions thereof by latches 87 pivoted at 88 and urged by springs 89 to the active positions thereof.

If, during the counter-clockwise movement of a sector 71, there is sensed in zone 2 of the card column appropriate thereto a data-indicating perforation, the electromagnet 46 will be energized and will move its pivoted armature 90 clockwise, as viewed in Fig. 4A, so that a latch-operating member connected therewith moves its latch 87 against the action of its spring 89 to the inactive position thereof thereby to release the pawl 84 so that the pawl, under the influence of its spring 86, is engaged with the appropriate tooth 72 of the sector 71 according to the data-indicating position of zone 2 in which the perforation is sensed. In the event that during sensing of the column no perforation is sensed in zone 2 thereof the sector 71 will move counter-clockwise until the tooth 73 engages with the pawl 84, in the inactive position thereof, thereby to arrest further counter-clockwise movement of the sector 71. It will be understood that when sectors 48 or 71 are arrested by their respective teeth 52 and 73, the springs 62 and 83 respectively will be extended to permit the further movement of the restoring members 54, 75 to the end of their stroke as illustrated in Fig. 4A and as determined by the cams 60, 81.

Each sector 71 carriers four equi-spaced electrical brushes 92 connected by leads 93 with electrically conductive strips 94 carried by the sector 71, the upper ends of the strips being curved to be concentric with the axis of the fixed shaft 74. Each brush 92 is arranged for co-operation with a group of ten adjoining electric conductor bars 95, the bars being disposed to be parallel with the path in which the second selector members 71 are movable and insulated one from the other by strips of insulating material 96. The conductor bars 95 extend lengthwise across the whole assembly of sectors 71 so that each conductor bar 95 is common to each sector 71. Each conductor bar 95 is electrically connected with a contact 97, Fig. 5, arranged to co-operate with a moving contact 98, operation of which is effected by the character-determining humps 99 spaced around the periphery of the character-determining disc 8 appropriate thereto.

As stated, each brush 92 is arranged for co-operation with conductor bars in a group of ten adjoining bars and the significance of any particular conductor bar is predetermined according to the character-determining disc 8 to which it is electrically connected. In the embodiment of the invention being described it is assumed that, starting from the uppermost conductor bar 95, Fig. 4A, and following through to the last of the forty conductor bars at the bottom of the figure, the significance of the conductor bars is as follows:

| Group 1 | | Group 2 | | Group 3 | | Group 4 | |
|---|---|---|---|---|---|---|---|
| Bar 95 | Character | Bar 95 | Character | Bar 95 | Character | Bar 95 | Character |
| 1 | 1 | 1 | S | 1 | J | 1 | A |
| 2 | 2 | 2 | T | 2 | K | 2 | B |
| 3 | 3 | 3 | U | 3 | L | 3 | C |
| 4 | 4 | 4 | V | 4 | M | 4 | D |
| 5 | 5 | 5 | W | 5 | N | 5 | E |
| 6 | 6 | 6 | X | 6 | O | 6 | F |
| 7 | 7 | 7 | Y | 7 | P | 7 | G |
| 8 | 8 | 8 | Z | 8 | Q | 8 | H |
| 9 | 9 | 9 | £ | 9 | R | 9 | I |
| Blank | Blank | Blank | Blank | Blank | — | Blank | + |

From the foregoing table it will be observed that although there is provision for the interpretation of forty characters two of the conductor bars 95 are indicated as being "blank." One of these positions, the one in Group 1 is employed for the purpose of ensuring that printing is not effected when a sensed card column is blank and the other, in Group 2, may be used for any special character which it may be desired to include other than those listed above. For example it may, in some instances, be desired to include among the characters an asterisk, in which event the blank position of Group 4 can be connected with a character-determining disc 8 constructed to control the definition of an asterisk by a stylus 5, or the position may, if desired, be used to control the printing of automatic cyphers.

Each first sector 48 carries therewith an electrical brush 100, Figs. 4A and 5, which, according to the angular movement of sector 48, engages with one or other of the electrically conductive strips 94. A further brush 101 is connected to the brush 100 for movement therewith and is in electrical contact with a connecting piece 102 to which is connected a lead 103, Fig. 5, to the moving coil magnet 7 controlling the lengthwise movements of the stylus 5 appropriated to the sectors 48, 71.

Referring to Fig. 5 it is assumed that the first sector 48 has been arrested in the third tooth position thereof, that is by co-operattion of the tooth 51 with pawl 63, and that the second sector 71 has been arrested in the number 8 position thereof. Accordingly, the circuit from the supply passes through magnet 7, lines 103, Fig. 5, brushes 101, 100, electrically conductive strip 94, lead 93 to the brush 92 for the second group of conductor bars 95, the eighth bar 95 in the second group, to contacts 97, 98 controlled by character-determining disc 8 representative of character "Z" and lead 38. Thus the moving coil magnet 7, under control of the character-determining disc representative of "Z" controls the operation of its stylus 5 to effect definition on the card C of the character "Z."

During the return movement of the restoring members 54, 75, the sectors 48, 71 are engaged thereby and are all restored to the starting or inactive positions thereof. During this return movement of the restoring members an abutment 104 carried by each is moved into contact with active pawls 63, 84 thereby to push the pawls out of engagement with their sectors and into latching engagement with their latches 66, 87 in preparation for the sensing operation to be performed on the next succeeding card.

When data sensed from one card is to be imprinted on a succession of succeeding cards, this can be effected by providing means to prevent the restoring members 54, 75, from restoring the sectors 48, 71 from the set or latched positions thereof. To control this function the machine is provided with a preliminary sensing device operable in advance of the sensing devices 16, 17. The preliminary sensing device need not sense the whole card as the device is controlled by a control hole punched in a card in zone 3 of a column which is not employed for the recording of data. It is found in practice that there is always one or more such card columns on all cards and that such columns usually occur at one end of the card.

The preliminary sensing device comprises mutually rockable upper and lower sensing members between which a card is moved, the upper sensing member consisting of a block 105, Fig. 10, carried by a plate 106 made from insulating material and supported by a frame 107 for movement with a rocking shaft 108. The block 105 supports a plurality of sensing pins 109, the pins being arranged, as shown in Fig. 11, in pairs and each forms part of a spring 110, Fig. 10, which urges it towards a sector-shaped electrical conductor forming part of the lower sensing member. The sensing pins 109 are of small diameter and are so spaced that if a card fed to the preliminary sensing device is in correct sensing relation with the pins both pins of a pair will enter a control hole formed in the card. The arrangement is, however, such that one pin only of a pair is needed properly to sense the presence of a control hole and the arrangement is therefore such as to permit a margin of error in the positioning of the card without detriment to the operation of the preliminary sensing device. The lower sensing member comprises a plurality of sector-shaped electrical conductors, Figs. 10 and 11, insulated one from the other, one conductor 111 being provided for each card column to be sensed and arranged for co-operation with each of the pair of sensing pins provided for that column. The conductors 111 are clamped between arms 112 secured to a rocking shaft 113.

The block 105 also has secured thereto a plate 114 which projects into the path of the cards fed to the sensing device. Rocking of the shafts 108, 109 is effected from the main shaft 9 by the cam 60 which also co-operates with a follower roller 116 carried by an arm 117 pivoted at 118. To the arm 117 is connected one end of a link 119, the upper end of which is connected to an arm 120, Fig. 12, pivoted at 121 and carrying a laterally extending pin 122 which is engaged with a rocker arm 123 secured to the rock shaft 113. The rocker arm 123 is provided with a nose 124 which co-operates with a tail 125 on a second rocker arm 126 secured to the rock shaft 108. A spring 127 tends to urge the rocker arms 123, 126 into co-operation with each other. Just before a card reaches the preliminary sensing device, the upper and lower sensing members are rocked to the right, as viewed in Fig. 10, that is in a direction opposed to the direction of movement of the card C approaching the sensing device thereby to move the sensing pins 109 towards and then away from the conductors 111 to permit the passage of the leading edge of the card therebetween. The timing of the cam 60 in relation to the rate of feeding of the card is such that the leading edge of the card engages the plate 114 thereby to push it forward slightly so that the rocker arms 123, 126 occupy the full line positions thereof shown in Fig. 12, this movement being such as generally to ensure that the sensing pins 109 are accurately in register with the A positions in zone 3 of the card columns.

At this time the cam 60 operates to return the upper and lower sensing members to the normal positions thereof, the pin 122 then being in the dotted position indicated in Fig. 12, at a linear speed corresponding to that of the card and during this return movement the cam 60 by co-operation with roller 115 on an arm 217 effects closing of a contact 128, Fig. 11, which controls the application of electric potential to an electro-magnet 129, Figs. 7 and 8. Thus, if a control hole is sensed by the pins 109, thereby causing co-operation between the pins and their electrically conductive sector 111, the magnet 129 is energized and the armature 130 thereof is moved to the left, as viewed in and to the position shown in Fig. 6, carrying with it a toggle setting member in the form of a pin 131, the purpose of which will be described below.

The magnet 129 forms part of a time lag device which ensures that printing of a preceding card has been completed before the return movement of the restoring members 54, 75 is prevented, if need be, by reason of the preliminary sensing device sensing a succeeding card with no control hole therein, thereby indicating that the setting of the sectors 48, 71 is to be retained to permit printing of the set information on the succeeding card at that time being sensed by the preliminary sensing device.

The latching of the restoring members to prevent the return movement thereof is effected by the latching plates 132, 133 secured respectively to the restoring members 54, 75. The latching plates 132, 133 are provided respectively with latching teeth 134, 135 for co-operation with a rockable toothed bell-crank 136 pivoted at 137 and provided with teeth 138, 139 which, on movement of the bell-crank 136, are simultaneously engaged or disengaged from the toothed latching plates 132, 133. Connected to the toothed bell-crank 136 is one end of a link 140 the other end of which is connected to a link-operating arm 141, Fig. 7, pivoted at 142 and carrying an arcuate member 143 arranged for co-operation with toggles about to be described.

The time lag device also includes a toggle-carrying plate 144 secured to a spindle 145 rotated in a clockwise direction, as viewed in Fig. 7, by co-operating gears 146, 147, Fig. 6, rotated by means not shown, so that the plate 144 completes one revolution for three revolutions of the main shaft 9. The plate 144 carries three toggles each consisting of an arm 148 pivoted at 149, to plate 144, a second arm 150 also pivoted at 149, and a toggle link 152 pivotally connected to each of the arms 148, 150. The arm 148 has a pin 153 extending laterally therefrom and the arm 150 has a pin 154 extending laterally therefrom. The arms 148, 150 of the toggle are urged to both their extreme positions by springs 155. Mounted in the path of the toggles is a fixed trip member shown as a plate 156 supported by a bracket 157 and as the toggle-carrying plate 144 rotates, should a toggle be in the active condition thereof, its pin 153 is engaged by the left-hand, as viewed in Fig. 7, corner or edge of the trip member 156 thereby to rock the toggle to the idle or inactive position thereof in which its pin 154 will not co-operate with the arcuate member 143. If, however, the electro-magnet 129 has not been energized as the result of sensing no control hole by the preliminary sensing device, the pin 131 will be positioned in the path of a toe 158 on arm 150 of the toggle and by engagement therewith will restore the toggle to the active position thereof. In the event that the pin 131 restores the toggle to the active position thereof its pin 154, on being moved past the arcuate member 143 will engage the member 143, as illustrated in Fig. 7, to move the link-operating arm 141 counter-clockwise, as viewed in Fig. 7, about its pivot 142, thereby causing downward movement of link 140 to rock the toothed bell-crank 136 counter-clockwise, as viewed in Fig. 6, about its pivot 137 so that the teeth 138, 139 carried thereby are moved into co-operation with the teeth of the latching plates 132, 133 to prevent restoration of the restoring members 54, 75 so that the setting which has been made on the sectors 48, 71 is retained for a further cycle of the main shaft 9 and, accordingly, the data set-up on the sectors 48, 71 is printed on the next succeeding card.

If, however, the preliminary sensing device has sensed a control hole in the card next succeeding that just sensed by the sensing device 16, 17, the electro-magnet 129 will be energized and its armature 130 will retract the pin 131, to the position shown in Fig. 6, from the path of the toe 158 of the toggle next approaching the position normally occupied by the pin 131. Accordingly, as the trip member 156 has, should it have been active, set the toggle to the inactive position thereof it will remain in this inactive condition and as its pin 154 is moved past the arcuate member 143 it will not co-act therewith to effect rocking of the link-operating arm 141, the toothed bell-crank 136 will not engage with the latching plates 132, 133, and the normal return movement of the restoring bars 54, 75 will take place to restore the sectors 48, 71 to the inactive or starting positions thereof in preparation for the sensing of the next card by the sensing device 16, 17.

Should the toggle be in its active position when passing the arcuate member 143, its pin 154 will, during its continued clockwise movement, engage with a lever 159 secured to a spindle 160 which also carries a horizontal guide 161 over which cards leaving the imprinting position normally pass into the receiver 15. When, however, the lever 159 is rocked by a pin 154 it is rocked counter-clockwise, as viewed in Fig. 7, so that the guide 161 is raised and the card which was found by the preliminary sensing device to have no control hole therein will, after passing the imprinting position, be engaged by the curved surface 162 of the guide 161 and directed thereby into the receiver 14. Accordingly, it will be understood that the cards are segregated into the receivers 14, 15 according as to whether they do not, or do possess control holes.

The circuit to the electro-magnet 129 is made through contacts 163, 164, Figs. 8 and 9, the contact 164 being carried by a mounting 165 made of insulating material and secured to a manually rotatable spindle 166 screwed into a boss 167 and carrying a stop 168 on its screwed end. As shown in Fig. 9, the contacts 163, 164 are in active position thereof thereby to permit energization of the electro-magnet 129 on the sensing of a control hole by the preliminary sensing device.

If it is desired to render inactive the preliminary sensing device so that the restoring members 54, 75 are operated to restore the sectors 48, 71 to their inactive or starting positions after the sensing and printing effected on each card, this is effected by a knob 169, Fig. 8, secured to the spindle 166, the knob 169 and spindle 166 being turned until the stop 168 abuts the boss 167 thereby turning the contact 164 out of engagement with contacts 163 which, accordingly, are engaged by the insulating mounting 165 thereby breaking the circuit to the electromagnet 129 and rendering the preliminary sensing device ineffective even though the preliminary sensing device senses a control hole in a card. The armature 130 is slidable axially of spindle 166 and is retained in abutting relation with an end of mounting 165 by a spring 170 against the action of which it is moved axially of spindle 166 when magnet 129 is energized. On rotation of spindle 166 to render the magnet 129 inactive the axial movement of the spindle 166, to the left as viewed in Figs. 6 and 8, also causes the armature 130 to be moved to, and retained in, the inactive position thereof so that the pin 131 carried thereby is held permanently out of the path of the toes 158 of the toggles.

With the electro-magnet 129 and pin 131 rendered permanently inactive, the toggles carried by the toggle-carrying plate 144 remain permanently in the inactive positions thereof so that no pin 154 co-operates with the arcuate plate 143 and the toothed bell-crank 136 remains in the inactive position thereof in which position the teeth thereon do not co-operate with the latching plates 132, 133 to prevent the return movement of the restoring members 54, 75.

I claim:

1. Apparatus for decoding data recorded in code by data-indicating indicia in zonal areas of vertical columns of statistical record cards, comprising a sensing device operable to sense a moving card and to transmit electric signals representative of coded data sensed from a card, an electric signal transmitter for each of a predetermined number of characters any one of which may be recorded in code in a card column, a selector member for each zonal area of each card column sensed, said selector members being movable in predetermined paths in timed relation with movement of a card during sensing thereof, an arrester element co-operating with each selector member and operable to arrest movement thereof in accordance with a signal received thereby from the sensing device, a plurality of electric conductor bars disposed to be parallel with the path in which a predetermined one of the selector members for each card column is movable said bars being connected electrically each to a predetermined one of the signal transmitters, a plurality of electric brushes movable with each said predetermined one selector member, each said brush being supported by its selector member to co-operate with a group of adjoining conductor bars different from groups of bars with which the other brushes respectively co-operate, and electric connecting elements connecting the selector members to determine which said brush and conductor bar is rendered active to condition the signal transmitter controlled thereby.

2. Apparatus according to claim 1, including for each card column sensed a first selector member arrestable by its arresting element in any one of a predetermined number of positions thereof, a second selector member which is said predetermined one selector member and is arrestable by its arresting element in any one of a predetermined number of positions thereof, a number, equal to the number of predetermined positions for the first selector member, of equi-spaced electrical brushes carried by the second selector member each for co-operation with a group of conductor bars of which each group consists of a number of bars corresponding to the number of predetermined positions for the second selector member, electric connecting elements carried by the second selector element and connected one to each said brush, a movable electric connecting element movable with said first selector member for co-operation with one or other of said connecting elements, a first restoring member common to all first selector members to control movement thereof, a second restoring member common to all second selector members to control movement thereof, and cam controlled elements to effect operation of the first and second restoring members in timed relation with each other and with movement of a card during sensing thereof.

3. Apparatus according to claim 2, wherein the first and second selector members each comprises a toothed sector movable angularly about a fixed axis, the axis of the first sector being located above that for the second sector and in the same plane.

4. Apparatus according to claim 3, wherein each sector-arresting element comprises a pawl pivoted for angular movement about a fixed axis to co-operate with the teeth on its sector, and including a pivoted latch for each pawl, a latch-operating member co-operating with each latch to render the latch inactive in relation to its pawl, and an electro-magnet connected to the latch-operating member and operable under control of an electric signal from the sensing device to effect operation of the latch-operating member.

5. Apparatus according to claim 3, wherein the restorting members are movable angularly about the respective axes of the sectors and including co-operating latch elements operable to latch the restoring members against restoring the sectors to the starting positions thereof, and a preliminary sensing device operable in advance of said first mentioned sensing device to sense a predetermined control-indicating position on a card and co-operating with the latch elements to effect latching of the restoring members when a control-indicating hole in a card is sensed by the preliminary sensing device.

6. Apparatus according to claim 5, wherein the preliminary sensing device includes mutually rockable upper and lower sensing members between which a card is moved, rocking elements operable in timed relation with the movement of a card and connected with the sensing members to effect mutual rocking thereof, an electro-magnet electrically connected with the sensing members for control thereby and having an armature to control operation of the said latch elements, and a switch operable in timed relation with the movement of the cards to control the application of electric energy to the magnet circuit when a card is in the desired sensing relation with said sensing members.

7. Apparatus according to claim 6, wherein the latch elements comprise a toothed latching plate movable angularly with each restoring member, and a rockable toothed bell-crank carrying thereon two teeth one for co-operation with each said latching plate whereby the teeth on the bell-crank are simultaneously engaged with or disengaged from the toothed latching plates.

8. Apparatus according to claim 7, including a link connected to the bell-crank to effect rocking thereof, and a time-lag device controlled by the armature of said electromagnet and co-operating with said link to effect actuation thereof.

9. Apparatus according to claim 8, wherein the time-lag device includes a toggle-carrying plate rotatable in timed relation with the rocking of said sensing members, a plurality of equi-spaced toggles carried by the toggle-carrying plate, a fixed trip member mounted in the path of said toggles to move active ones thereof to an inactive position thereof, a toggle-setting member movable with said armature to move the toggles to active conditions thereof, and a link-operating arm connected with said link and movable by a toggle in the active condition thereof whereby to effect operation of the link to cause co-operation of the toothed bell-crank with the toothed latching plates.

10. Apparatus for decoding data recorded in code by data-indicating indicia in zonal areas of vertical columns of statistical record cards, comprising a sensing device operable to sense a moving card and to transmit electric signals representative of coded data sensed from a card, an electric signal transmitter for each of a predetermined number of characters any one of which may be recorded in code in a card column, a first and a second selector member, one for each zonal area of each card column sensed, each supported for angular movement to and from a datum position thereof, an arresting element for each selector member to arrest the selector member appropriate thereto in any one of a predetermined number of positions thereof, a plurality of electric conductor bars disposed to be parallel with the arcuate path in which said second selector member is movable, said bars being connected electrically each to a predetermined one of the signal transmitters, a number, equal to the number of predetermined positions for the first selector member, of equi-spaced electrical brushes carried by the second selector member each for co-operation with a group of conductor bars of which each group consists of a number of bars corresponding to the number of predetermined positions for the second selector member, electric connecting elements carried by the second selector member and connected one to each said brush, a movable electric connecting element movable with the first selector member for co-operation with one or other of said connecting elements, a first restoring member common to all first selector members, a second restoring member common to all second selector members, said restoring members being angularly movable about the axes about which their respective selector members are angularly movable, and co-operating with the selector members to control angular movement thereof, cam controlled elements to effect operation of the restoring members in timed relation with each other and with movement of a card during sensing thereof, and selectively operable latch elements operable to latch the restoring members against restoring the selector members to the datum positions thereof.

11. Apparatus according to claim 10, including a preliminary sensing device operable in advance of said first-mentioned sensing device to sense a predetermined control-indicating position on a card and co-operating with said latch elements to effect latching of the restoring members when a control-indicating indicia on the card is sensed by the preliminary sensing device.

12. Apparatus according to claim 11, wherein the preliminary sensing device includes mutually rockable upper and lower sensing members between which a card is moved, rocking elements operable in timed relation with the movement of a card and connected with the sensing members to effect mutual rocking thereof, an electro-magnet electrically connected with the sensing members for control thereby and having an armature to control operation of said latch elements, and a switch operable in timed relation with the movement of the cards to control the application of electric energy to the magnet circuit when a card is in the desired sensing relation with said sensing members.

13. Apparatus according to claim 12, wherein the latch elements comprise a toothed latching plate movable angularly with each restoring member, and a rockable toothed bell-crank carrying thereon two teeth one for co-operation with each said latching plate whereby the teeth on the bell-crank are simultaneously engaged with or disengaged from the toothed latching plates.

14. Apparatus according to claim 13, including a link connected to the bell-crank to effect rocking thereof, and a time-lag device controlled by the armature of said electro-magnet and co-operating with said link to effect actuation thereof.

15. Apparatus according to claim 14, wherein the time-lag device includes a toggle-carrying plate rotatable in timed relation with the rocking of said sensing members, a plurality of equi-spaced toggles carried by the toggle-carrying plate, a fixed trip member mounted in the path of said toggles to move active ones thereof to an inactive position thereof, a toggle-setting member movable with said armature to move the toggles to active conditions thereof, and a link-operating arm connected with said link and movable by a toggle in the active condition thereof thereby to effect operation of the link to cause co-operation of the toothed bell-crank with the toothed latching plates.

16. Apparatus for decoding data recorded in code by data-indicating indicia in zonal areas of vertical columns of statistical record cards, comprising a sensing device operable to sense a moving card and to transmit electric signals representative of coded data sensed from a card, an electric signal transmitter for each of a predetermined number of characters any one of which may be recorded in code in a card column, a first and a second toothed sector, one for each zonal area of each card column sensed, each sector being supported for angular movement about a fixed axis to and from a datum position thereof and the axis of the first sector being located above that for the second sector and in the same plane, an arresting element for each sector to arrest the sector appropriate thereto in any one of a predetermined number of positions thereof, a plurality of electric conductor bars disposed to be parallel with the arcuate path in which said second sector is movable, said bars being connected electrically each to a predetermined one of the signal transmitters, a number, equal to the number of predetermined positions for the first sector, of equi-spaced electrical brushes carried by the second sector each for co-operation with a group of conductor bars of which each group consists of a number of bars corresponding to the number of predetermined positions for the second sector, electric connecting elements carried by the second sector and connected one to each said brush, a movable electric connecting element movable with the first sector for co-operation with one or other of said connecting elements, a first restoring member common to all first sectors, a second restoring member common to all second sectors, said restoring members being angularly movable about the axes about which their respective sectors are angularly movable, and co-operating with the sectors to control angular movement thereof, cam controlled elements to effect operation of the restoring members in timed relation with each other and with movement of a card during sensing thereof, and selectively operable latch elements operable to latch the restoring members against restoring the sectors to the datum positions thereof.

17. Apparatus according to claim 16, wherein each sector arresting element comprises a pawl pivoted for angular movement about a fixed axis to co-operate with the teeth on its sector, and including a pivoted latch for each pawl, a latch-operating member co-operating with each latch to render the latch inactive in relation to its pawl, and an electro-magnet connected to the latch-operating member and operable under control of an electric signal from the sensing device to effect operation of the latch-operating member.

18. Apparatus according to claim 17, wherein the restoring members are movable angularly about the respective axes of the sectors and including co-operating latch elements operable to latch the restoring members against restoring the sectors to the starting positions thereof, and a preliminary sensing device operable in advance of said first mentioned sensing device to sense a predetermined control-indicating position on a card and co-operating with the latch elements to effect latching of the restoring members when a control-indicating hole in a card is sensed by the preliminary sensing device.

No references cited.